(12) United States Patent
Shafri et al.

(10) Patent No.: US 11,587,416 B1
(45) Date of Patent: Feb. 21, 2023

(54) DYNAMIC VIDEO ANALYTICS RULES BASED ON HUMAN CONVERSATION

(71) Applicant: MOTOROLA SOLUTIONS, INC., Chicago, IL (US)

(72) Inventors: Haziq Iqram Bin Mohammed Shafri, Chemor (MY); Seow Hong Chan, Bayan Lepas (MY); Chung Yong Chong, Bayan Lelpas (MY); Choon Hong Wong, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/446,627

(22) Filed: Sep. 1, 2021

(51) Int. Cl.
| | |
|---|---|
| *G08B 13/196* | (2006.01) |
| *G06F 40/289* | (2020.01) |
| *G06V 20/62* | (2022.01) |
| *G06V 40/16* | (2022.01) |

(52) U.S. Cl.
CPC ..... *G08B 13/19613* (2013.01); *G06F 40/289* (2020.01); *G06V 20/62* (2022.01); *G06V 40/172* (2022.01)

(58) Field of Classification Search
CPC ............ G08B 13/19613; G06F 40/289; G06V 20/62; G06V 40/172
See application file for complete search history.

(56) References Cited

U.S. PATENT DOCUMENTS

| | | | |
|---|---|---|---|
| 7,840,515 B2 | 11/2010 | Ozdemir et al. | |
| 8,769,642 B1 | 7/2014 | O'Neill et al. | |
| 9,208,675 B2 | 12/2015 | Xu et al. | |
| 9,947,155 B2 | 4/2018 | Trani | |
| 9,990,643 B2 | 6/2018 | Yoder et al. | |
| 10,750,209 B1* | 8/2020 | Edwards | H04N 7/188 |
| 11,074,471 B2* | 7/2021 | Beach | G06V 10/96 |
| 11,122,341 B1* | 9/2021 | Decrop | H04N 21/44008 |

(Continued)

FOREIGN PATENT DOCUMENTS

| | | | | |
|---|---|---|---|---|
| WO | 2019177470 A1 | 9/2019 | | |
| WO | WO-2019222725 A1 * | 11/2019 | ............. | G06N 20/00 |

OTHER PUBLICATIONS

M. Wieland, H. Schwarz, U. Breitenbücher and F. Leymann, "Towards situation-aware adaptive workflows: SitOPT—A general purpose situation-aware workflow management system," 2015 IEEE International Conference on Pervasive Computing and Communication Workshops (PerCom Workshops), 2015, pp. 32-37, doi: 10.1109/PERCOMW.2015.7133989.

(Continued)

*Primary Examiner* — Fernando Alcon

(57) ABSTRACT

At least one detected natural language phrase in audio describes at least one expected future object activity in a definable physical or geographic region. For each of one or more potential video analytic rules that are derivable from the at least one natural language phrase, whether compatibility with corresponding workflow requirements of an entity exists may be determined, such that one, some or all of the one or more potential video analytic rules are confirmed as one or more workflow-compatible video analytic rules. The one or more workflow-compatible video analytic rules are implemented within a video security system for respective one or more periods of time. For each of the implemented video analytic rules, a notification may be generated: when a rule violation of the respective video analytic rule triggers an event; or following expiry of the respective period of time of the one or more periods of time.

16 Claims, 14 Drawing Sheets

(56) References Cited

U.S. PATENT DOCUMENTS

| | | |
|---|---|---|
| 2005/0271250 A1 | 12/2005 | Vallone et al. |
| 2006/0200371 A1 | 9/2006 | Spector et al. |
| 2006/0227237 A1 | 10/2006 | Kienzle et al. |
| 2013/0038737 A1* | 2/2013 | Yehezkel ............... G11B 27/28 348/E7.085 |
| 2014/0293048 A1 | 10/2014 | Titus et al. |
| 2017/0116987 A1* | 4/2017 | Kang ..................... G10L 15/26 |
| 2017/0263256 A1 | 9/2017 | Sachdev et al. |
| 2018/0018990 A1* | 1/2018 | Kim ................... G10L 19/0017 |
| 2018/0341806 A1 | 11/2018 | Chavez et al. |
| 2019/0012602 A1 | 1/2019 | Mishra et al. |
| 2019/0043500 A1 | 1/2019 | Sahlsten |
| 2019/0278976 A1* | 9/2019 | Khadloya .............. G06V 20/52 |
| 2019/0286901 A1 | 9/2019 | Blanco et al. |
| 2020/0184278 A1* | 6/2020 | Zadeh ................. G06K 9/6264 |
| 2021/0081499 A1* | 3/2021 | Rakshit ................ G06F 40/279 |
| 2021/0104247 A1 | 4/2021 | Alcock et al. |
| 2022/0031162 A1* | 2/2022 | Greenwood ........... G06V 40/25 |
| 2022/0343119 A1* | 10/2022 | Smith ................... G06F 40/211 |

OTHER PUBLICATIONS

Orchestrate User Guide, Motorola Solutions, Inc.—MN007834A01-B, Mar. 2021, all pages.
Orchestrate System Planner, Motorola Solutions, Inc.—MN007836A01-B, Mar. 2021, all pages.
The International Search Report and the Written Opinion, corresponding patent application No. PCT/US2022/041140, filed Aug. 23, 2022, dated Dec. 16, 2022, all pages.

\* cited by examiner

DYNAMIC VIDEO ANALYTICS RULES BASED ON HUMAN CONVERSATION

BACKGROUND

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that some operator wishes to implement a first workflow that notifies particular radios if a door breach is detected. Assume that the operator also wishes to implement a second workflow that also notifies the particular radios when a security camera detects loitering. In order to implement these two workflows, the access control system will have to be configured to provide the notifications to the radios and the video security system will have to be configured to provide the notifications to the radios. Thus, both the access control system and the video security system will need to be configured separately in order to implement the two workflows. As is evident, this requires the operator to have an in-depth knowledge of both the video security system and the access control system. Thus, the lack of continuity across systems is a burden to operators since an in-depth knowledge of all systems within the ecosystem will be needed in order to properly configure workflows within the ecosystem.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
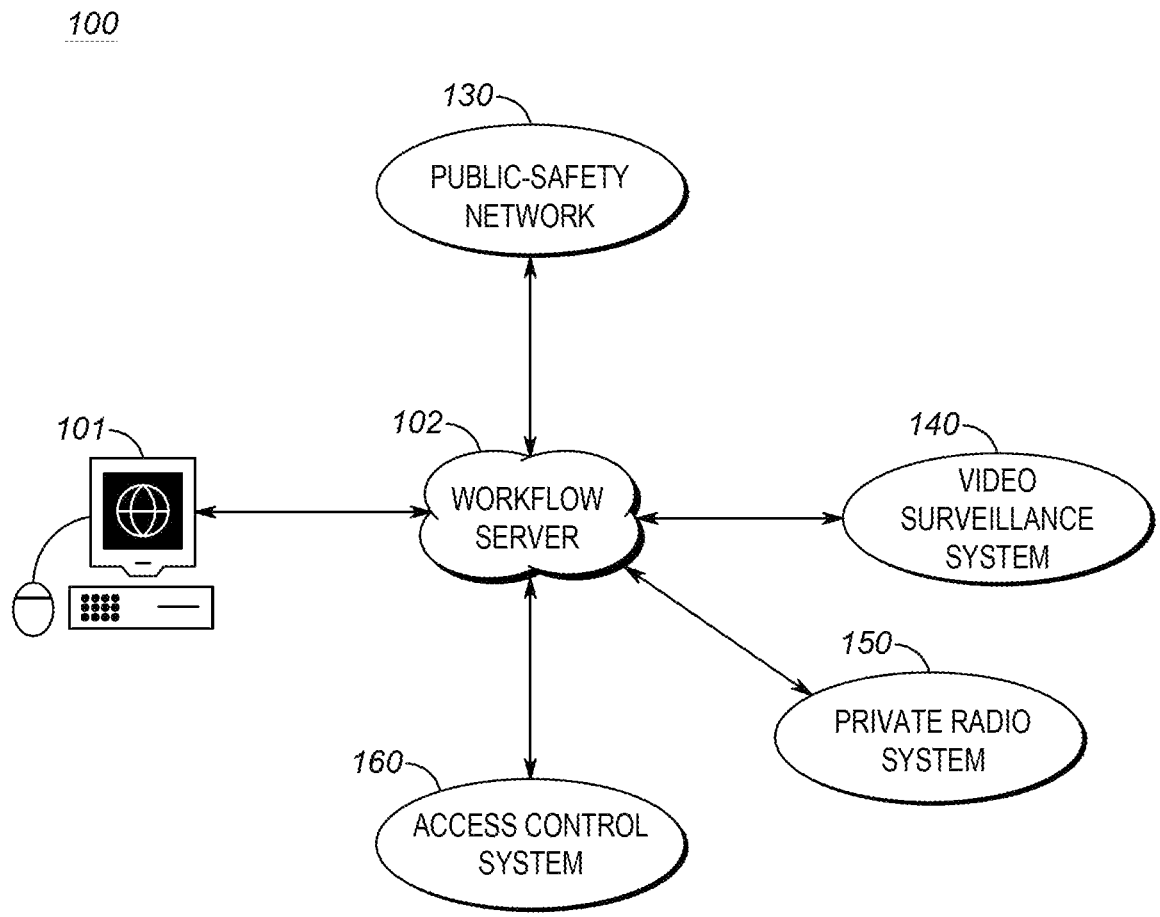
FIG. 1 illustrates a security ecosystem capable of configuring and automating workflows.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In accordance with one example embodiment, there is provided a computer-implemented method that includes detecting at least one natural language phrase in audio. The at least one natural language phrase describes at least one expected future object activity in a definable physical or geographic region. For each of one or more potential video analytic rules that are derivable from the at least one natural language phrase, the computer-implemented method further includes determining whether compatibility with corresponding workflow requirements of an entity exists such that one, some or all of the one or more potential video analytic rules are confirmed as one or more workflow-compatible video analytic rules. The computer-implemented method also includes implementing the one or more workflow-compatible video analytic rules within a video security system for respective one or more periods of time. For each of the implemented video analytic rules, the computer-implemented method further includes generating a notification: when a rule violation of the respective video analytic rule triggers an event; or following expiry of the respective period of time of the one or more periods of time.

In accordance with another example embodiment, there is provided a computer-implemented method comprising that includes detecting at least one natural language phrase in audio. The at least one natural language phrase describes at least one expected future object activity in a definable physical or geographic region. The computer-implemented method also includes determining that an at least one video analytic rule, derivable from the at least one natural language phrase, cannot yet be implemented due to ambiguous information or due to missing information needed to satisfy corresponding workflow requirements of an entity. The computer-implemented method also includes generating a question expected to elicit an answer from which either the missing information will be obtained or the ambiguous information will be clarified. The computer-implemented method also includes perceptibly providing the question to a person via at least one of: displaying the question on a screen, and emitting the question audibly via a speaker. Once the missing information is obtained or the ambiguous information is clarified, the computer-implemented method also includes implementing the at least one video analytic rule within a video security system for a respective at least one period of time.

In accordance with yet another example embodiment, there is provided a security ecosystem that includes a microphone configured to receive audio. The security ecosystem also includes at least one processor in communication with the microphone, and the at least one processor is configured to detect at least one natural language phrase in the audio. The at least one natural language phrase describes at least one expected future object activity in a definable physical or geographic region. For each of one or more potential video analytic rules that are derivable from the at least one natural language phrase, the at least one processor is further configured to determine whether compatibility with corresponding workflow requirements of an entity exists such that one, some or all of the one or more potential video analytic rules are confirmed as one or more workflow-compatible video analytic rules. The security ecosystem also includes a video security system that is configured to implement the one or more workflow-compatible video analytic rules for respective one or more periods of time. For each of the implemented video analytic rules, the video security system is further configured to generate a notification: when a rule violation of the respective video analytic rule triggers an event; or following expiry of the respective period of time of the one or more periods of time.

Turning now to the drawings, wherein like numerals designate like components, FIG. 1 illustrates security ecosystem 100 capable of configuring and automating workflows across multiple systems. As shown, security ecosystem 100 comprises public-safety network 130, video security system 140, private radio system 150, and access control system 160. Workflow server 102 is coupled to each system 130, 140, 150, and 160. Workstation 101 is shown coupled to workflow server 102, and is utilized to configure server 102 with workflows created by a user. It should be noted that although the components in FIG. 1 are shown geographically separated, these components can exist within a same geographic area, such as, but not limited to a school, a hospital, an airport, a sporting event, a stadium, . . . , etc. It should also be noted that although only networks and systems 130-160 are shown in FIG. 1, one of ordinary skill in the art will recognize that many more networks and systems may be included in ecosystem 100.

Workstation 101 is preferably a computer configured to execute Motorola Solution's Orchestrate™ and Ally™ dispatch and incident management software. As will be discussed in more detail below, workstation 101 is configured to present a user with a plurality of triggers capable of being detected by network and systems 130-160 as well as present the user with a plurality of actions capable of being executed by network and systems 130-160. The user will be able to create workflows and upload these workflows to workflow server 102 based on the presented triggers and actions.

Workflow server 102 is preferably a server running Motorola Solution's Command Central™ software suite comprising the Orchestrate™ platform. Workflow server 102 is configured to receive workflows created by workstation 101 and implement the workflows. Particularly, the workflows are implemented by analyzing events detected by network and systems 130-160 and executing appropriate triggers. For example, assume a user creates a workflow on workstation 101 that has a trigger comprising security system 140 detecting a loitering event, and has an action comprising notifying radios within public-safety network 130. When this workflow is uploaded to workflow server 102, workflow server 102 will notify the radios of any loitering event detected by security system 140.

Public-safety network 130 is configured to detect various triggers and report the detected triggers to workflow server 102. Public-safety network 130 is also configured to receive action commands from workflow server 102 and execute the actions. In one embodiment of the present invention, public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from workflow server 102.

Video security system 140 is configured to detect various triggers and report the detected triggers to workflow server 102. Public-safety network 130 is also configured to receive action commands from workflow server 102 and execute the actions. In one embodiment of the present invention, video security system 140 comprises a plurality of video cameras that may be configured to automatically change their field of views over time. Video security system 140 is configured with a recognition engine/video analysis engine (VAE) that comprises a software engine that analyzes any video captured by the cameras. Using the VAE, the video security system 140 is capable of "watching" video to detect any triggers and report the detected triggers to workflow server 102. In a similar manner, video security system 140 is configured to execute action commands received from workflow server 102.

Radio system 150 preferably comprises a private enterprise radio system that is configured to detect various triggers and report the detected triggers to workflow server 102. Radio system 150 is also configured to receive action commands from workflow server 102 and execute the actions. In one embodiment of the present invention, radio system 150 comprises a MOTOBRO™ communication system having radio devices that operate in the CBRS spectrum and combines broadband data with voice communications.

Finally, access control system 160 comprises an IoT network. IoT system 160 serves to connect every-day devices to the Internet. Devices such as cars, kitchen appliances, medical devices, sensors, doors, windows, HVAC systems, drones, . . . , etc. can all be connected through the IoT. Basically, anything that can be powered can be connected to the internet to control its functionality. System 160 allows objects to be sensed or controlled remotely across existing network infrastructure. For example, access control system 160 may be configured to provide access control to various doors and windows. With this in mind, access control system 160 is configured to detect various triggers (e.g., door opened/closed) and report the detected triggers to workflow server 102. Access control system 160 is also configured to receive action commands from workflow server 102 and execute the action received from workflow server 102. The action commands may take the form of instructions to lock, open, and/or close a door or window.

As is evident, the above security ecosystem 100 allows an operator using workstation 101 to create rule-based, automated workflows between technologies to enhance efficiency, and improve response times, effectiveness, and overall safety. The above ecosystem 100 has the capability to detect triggers across a number of devices within network and systems 130-160 quickly take actions by automatically executing the proper procedure (i.e., executing the appropriate action once a trigger is detected).

Figure 2:
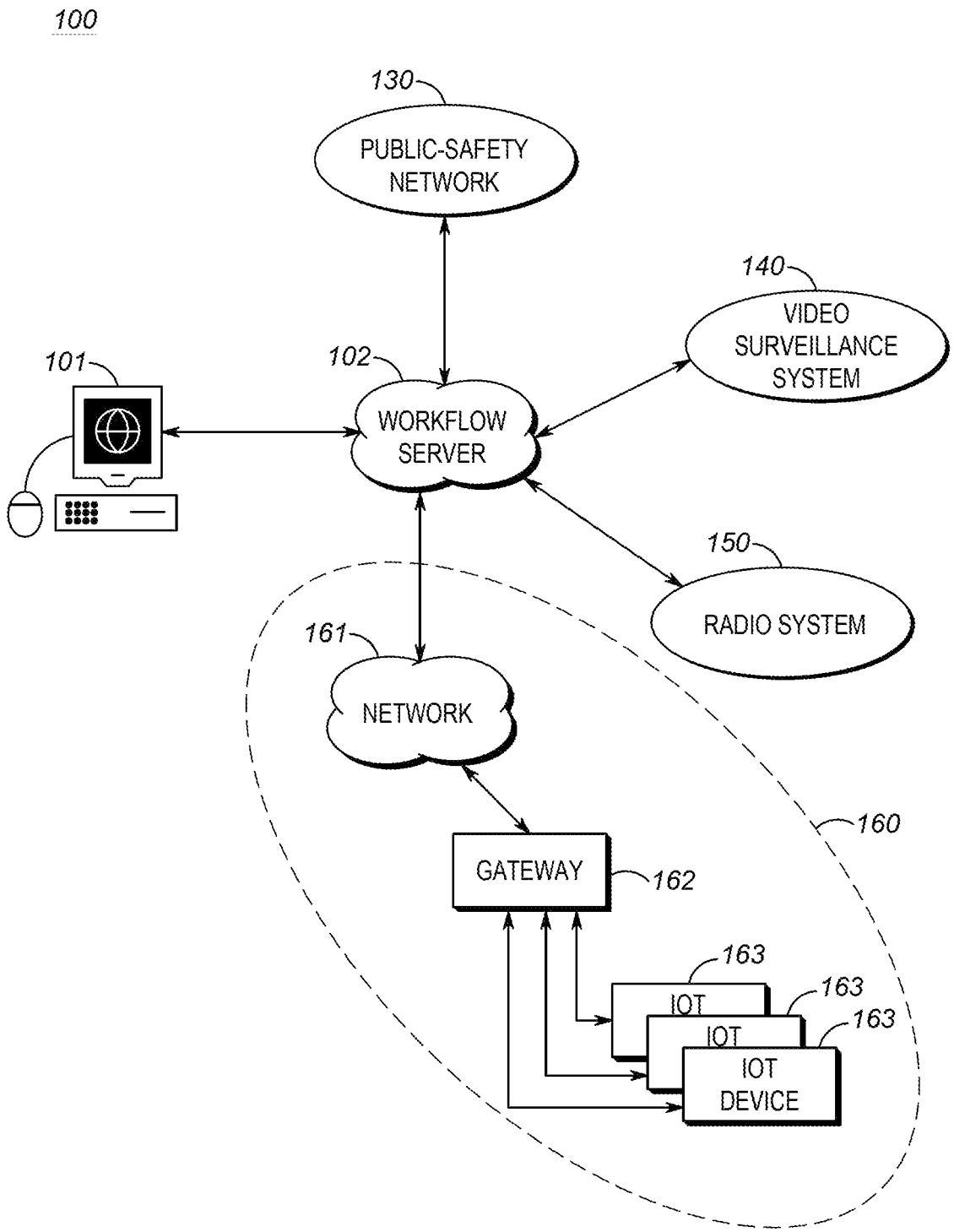
FIG. 2 illustrates a security ecosystem capable of configuring and automating workflows.

FIG. 2 illustrates a security ecosystem capable of configuring and automating workflows. In particular, FIG. 2 shows security ecosystem 100 with an expanded view of access control system 160. As shown, access control system 160 comprises a plurality of IoT devices 163 coupled to gateway 162. Data passed from workflow server 102 to IoT devices 163 passes through network 161, gateway 162 and ultimately to IoT device 163. Conversely, data passed from IoT devices 163 to workflow server 102 passes through gateway 162, network 161, and ultimately to workflow server 102.

IoT devices 163 preferably comprise devices that control objects, doors, windows, sensors, . . . , etc. As is known in the art, a particular communication protocol (IoT protocol)

may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

Gateway 162 is any suitable link enablement for communications configured to run the necessary Application Program Interface (API) to provide communications between any IoT device 163 and workflow server 102.

Network 161 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Figure 3:
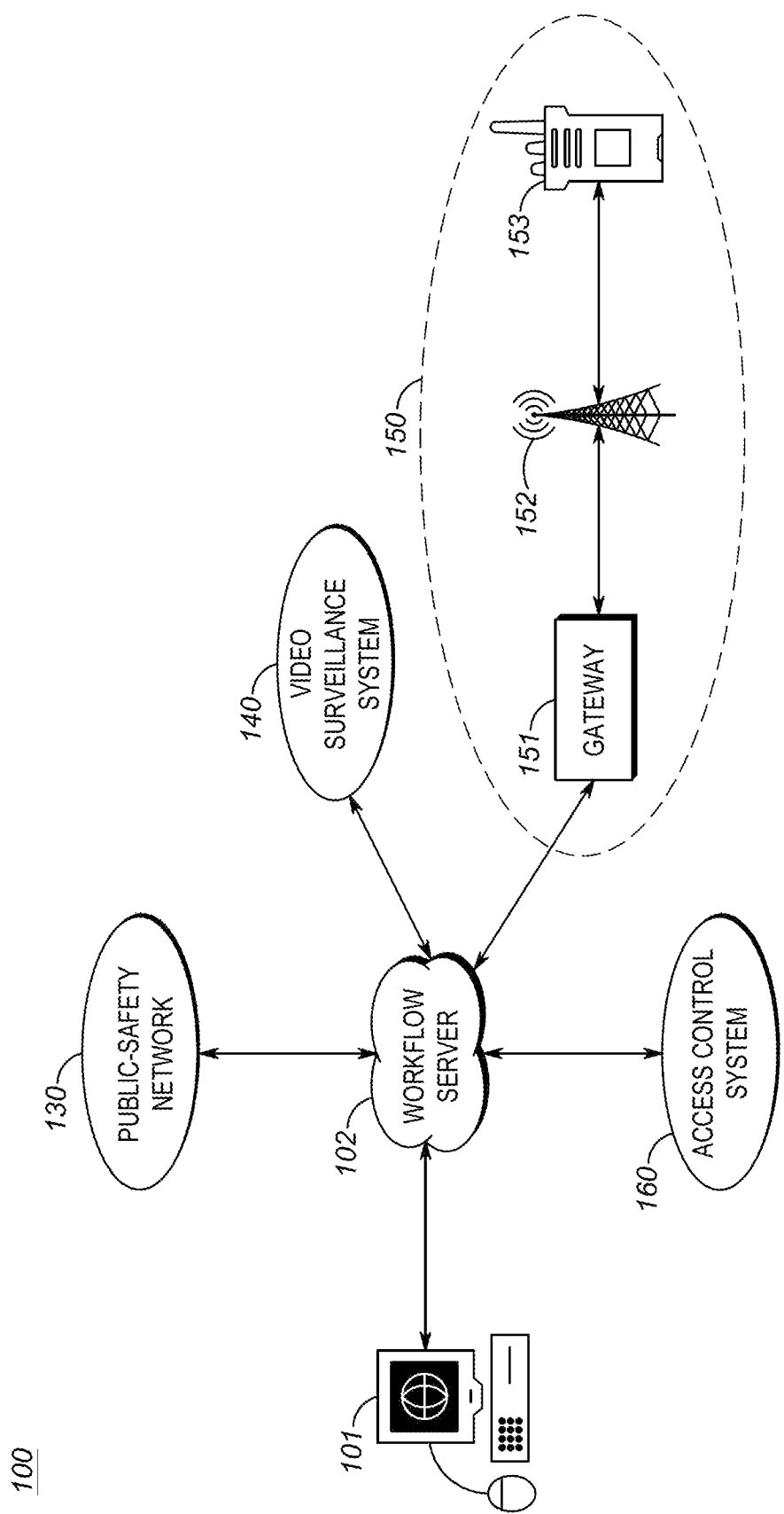
FIG. 3 illustrates a security ecosystem capable of configuring and automating workflows.

FIG. 3 illustrates a security ecosystem capable of configuring and automating workflows. In particular, FIG. 3 shows security ecosystem 100 with an expanded view of radio system 150. As shown, radio system 150 comprises gateway 151, system infrastructure 152, and at least one radio 153. Communications from radio 153 to workflow server 102 passes through infrastructure 152, gateway 151, and ultimately to workflow server 102.

Gateway 151 is any suitable link enablement for communications configured to run the necessary Application Program Interface (API) to provide communications between any infrastructure 152 and workflow server 102.

Infrastructure 152 comprises the necessary equipment to provide wireless communications to and from radio 153. Preferably, infrastructure 152 comprises Motorola Solutions MOTOBRO™ equipment, such as an SLR Series Repeater (e.g., SLR 1000, SLR 5000, or SLR8000 repeater) configured to provide two-way radio service to radio 153.

Although only a single radio 153 is shown in FIG. 3, one of ordinary skill in the art will recognize that many radios 153 may be present within radio system 150. Each radio 153 preferably comprises a MOTOBRO™ two-way radio (such as a Motorola Solution XPR 5000 Series radio) with digital technology providing integrated voice and data communication.

Figure 4:
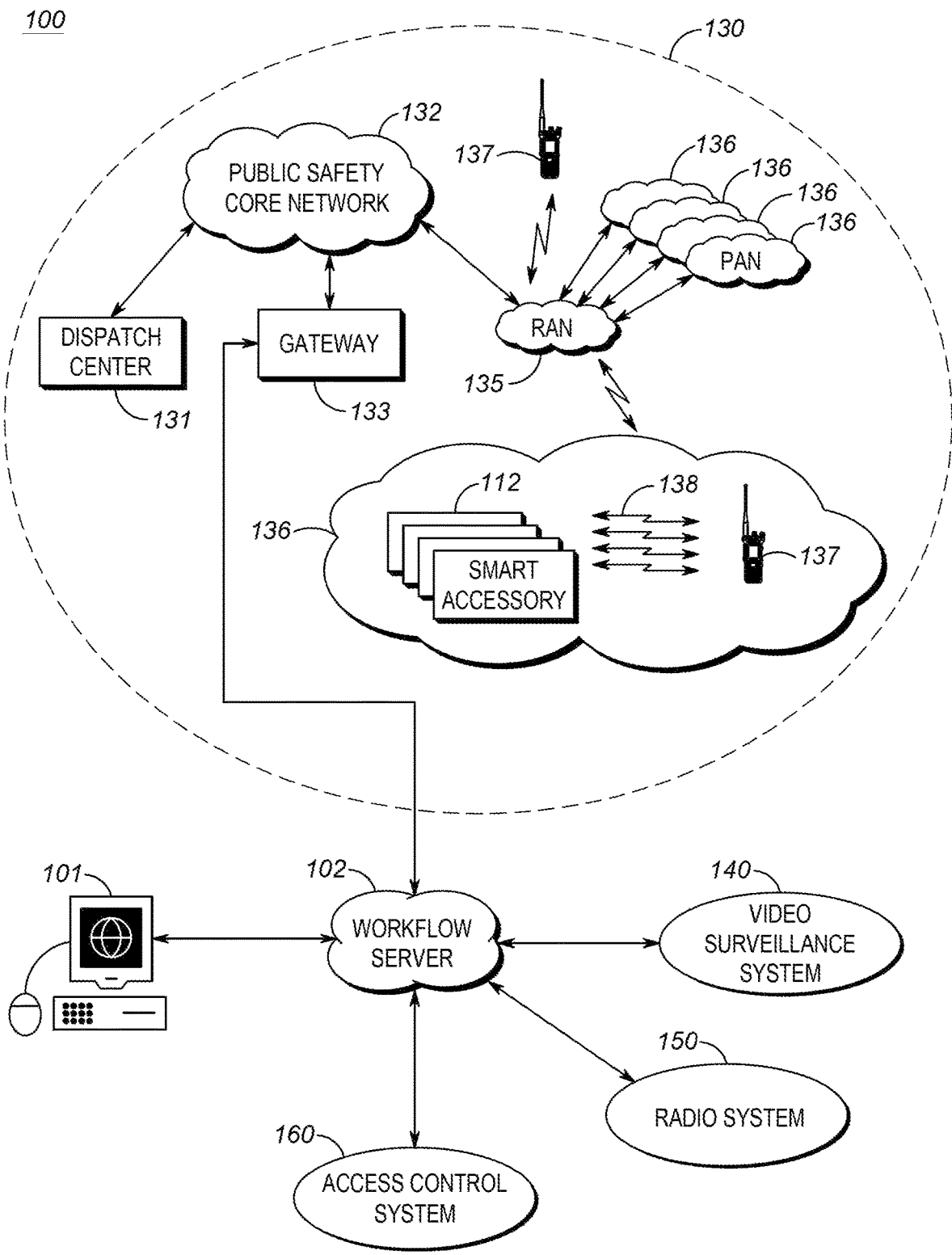
FIG. 4 illustrates a security ecosystem capable of configuring and automating workflows.

FIG. 4 illustrates a security ecosystem capable of configuring and automating workflows. In particular, FIG. 4 shows security ecosystem 100 with an expanded view of public safety network 130. As shown, public-safety network 130 comprises gateway 133, public-safety core network 132, dispatch center 131, radio access network (RAN) 135, at least one public-safety radio 137, and a plurality of personal-area networks (PANs) 136. As shown, each PAN 136 comprises radio 137 acting as a hub to smart devices/accessories 112.

Gateway 133 is any suitable link enablement for communications configured to run the necessary Application Program Interface (API) to provide communications between public-safety core network 132 and workflow server 102.

A public safety officer (not shown in FIG. 4) will be equipped with devices 112 that determine various physical and environmental conditions surrounding the public-safety officer. These conditions may be reported back to, for example, dispatch center 131 or workflow server 102 so an appropriate action may be taken. For example, future police officers may have a sensor 112 that determines when a gun is drawn. Upon detecting that an officer has drawn their gun, a notification may be sent back to the dispatch operator and/or workflow server 102 so that, for example, other officers in the area may be notified of the situation.

It is envisioned that the public-safety officer will have an array of these shelved devices 112 available to the officer at the beginning of a shift. The officer will select devices 112 off the shelf, and form a personal area network (PAN) with the devices that will accompany the officer on their shift. For example, the officer may pull a gun-draw sensor, a body-worn camera, a wireless microphone, a smart watch, a police radio, smart handcuffs, a man-down sensor, a bio-sensor, . . . , etc. All devices 112 pulled by the officer will be configured to form a PAN by associating (pairing) with each other and communicating wirelessly among the devices. At least one device may be configured with a digital assistant. In a preferred embodiment, the PAN comprises more than two devices, so that many devices may be connected via the PAN simultaneously.

A method called bonding is typically used for recognizing specific devices 112 and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device. Thus, as shown, public-safety communication system 130 incorporates PANs 136 created as described above. In a preferred embodiment of the present invention, radios 137 and devices 112 form PAN 136, with communication links 138 between devices 112 and radios 137 taking place utilizing a short-range communication system protocol such as a Bluetooth communication system protocol. In this particular embodiment, a pan will be associated with a single officer. Thus, FIG. 4 illustrates multiple PANs 136 associated with multiple officers (not shown).

RAN 135 includes typical RAN elements such as base stations, base station controllers (BSCs), routers, switches, and the like, arranged, connected, and programmed to provide wireless service to user equipment (e.g., radios 137, and the like) in a manner known to those of skill in the relevant art. RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 135 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 135 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 132 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 132 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or operator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Radios 137 serves as a PAN main device, and may be any suitable computing and communication device configured to engage in wireless communication with the RAN 135 over the air interface as is known to those in the relevant art. Moreover, one or more radios 137 are further configured to engage in wired and/or wireless communication with one or more local device 112 via the communication link 138. Radios 137 will be configured to determine when to forward information received from PAN devices to, for example, a dispatch center or workflow server 102.

Some examples follow of devices 112 follow:

A sensor-enabled holster 112 may be provided that maintains and/or provides state information regarding a weapon or other item normally disposed within the user's sensor-enabled holster 112. The sensor-enabled holster 112 may detect a change in state (presence to absence) and/or an action (removal) relative to the weapon normally disposed within the sensor-enabled holster 112. The detected change in state and/or action may be reported to portable radio 137 via its short-range transceiver, which may forward the state change to dispatch center 131 or workflow server 102. In some embodiments, the sensor-enabled holster may also detect whether the first responder's hand is resting on the weapon even if it has not yet been removed from the holster and provide such information to portable radio 137.

A biometric sensor 112 (e.g., a biometric wristband) may be provided for tracking an activity of the user or a health status of a user, and may include one or more movement sensors (such as an accelerometer, magnetometer, and/or gyroscope) that may periodically or intermittently provide to the portable radio 137 indications of orientation, direction, steps, acceleration, and/or speed, and indications of health such as one or more of a captured heart rate, a captured breathing rate, and a captured body temperature of the user, perhaps accompanying other information. This information may be reported to radio 137 which may forward the information to dispatch center 131 and/or workflow server 102.

An accelerometer 112 may be provided to measures acceleration. Single and multi-axis models are available to detect magnitude and direction of the acceleration as a vector quantity, and may be used to sense orientation, acceleration, vibration shock, and falling. The accelerometer 112 may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing. This information may be reported to radio 137 which may forward the information to dispatch center 131 and/or workflow server 102.

A heart rate sensor 112 may be provided and use electrical contacts with the skin to monitor an electrocardiography (EKG) signal of its wearer, or may use infrared light and imaging device to optically detect a pulse rate of its wearer, among other possibilities. This information may be reported to radio 137 which may forward the information to dispatch center 131 and/or workflow server 102.

A breathing rate sensor 112 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well. This information may be reported to radio 137 which may forward the information to dispatch center 131 and/or workflow server 102.

Dispatch center 131 comprises, or is part of, a computer-aided-dispatch center (sometimes referred to as an emergency-call center or public-safety answering point), that may be manned by an operator providing necessary dispatch operations. For example, dispatch center 131 typically comprises a graphical user interface that provides the dispatch operator necessary information about public-safety officers. As discussed above, some of this information originates from devices 112 providing information to radios 137, which forwards the information to RAN 135 and ultimately to dispatch center 131.

In a similar manner information about public-safety officers may be provided to workflow server 102. This information originates from devices 112 providing information to radios 137, which forwards the information to RAN 135 and ultimately to workflow server 102 via core network 132 and gateway 133. For example, a gun-draw sensor 112 may send an indication to workflow server 102 that a gun has been drawn. This may serve as a "trigger" for workflow server 102 to initiate a particular "action", for example, notifying surrounding officers (for example on a particular talkgroup) by having their radios 137 provide an alarm indicating the triggering event. Thus, workflow server 102 may provide instructions to any device 112 or radio 137 by sending an "action" to devices 112 in response to a trigger being received.

Figure 5A:
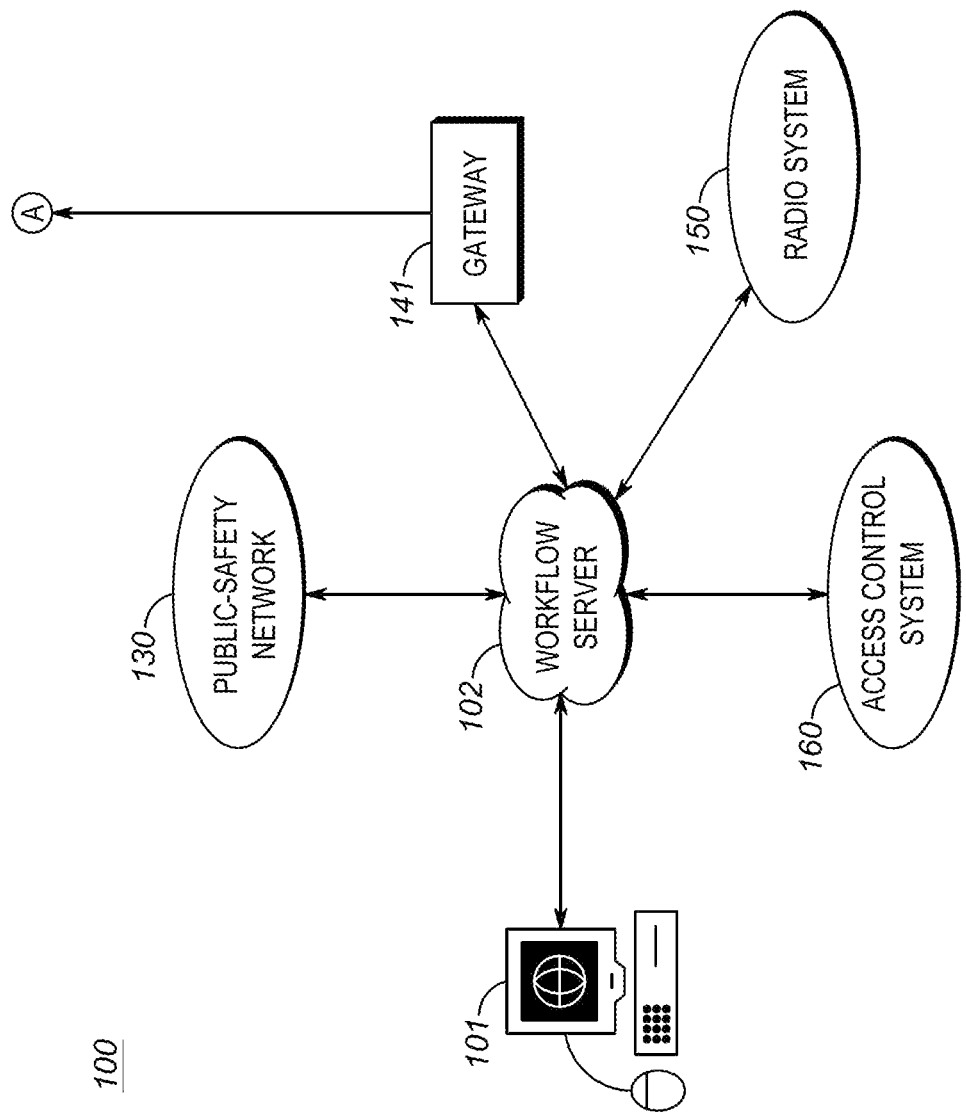
FIGS. 5A-5B illustrates a security ecosystem capable of configuring and automating workflows.
Figure 5B:
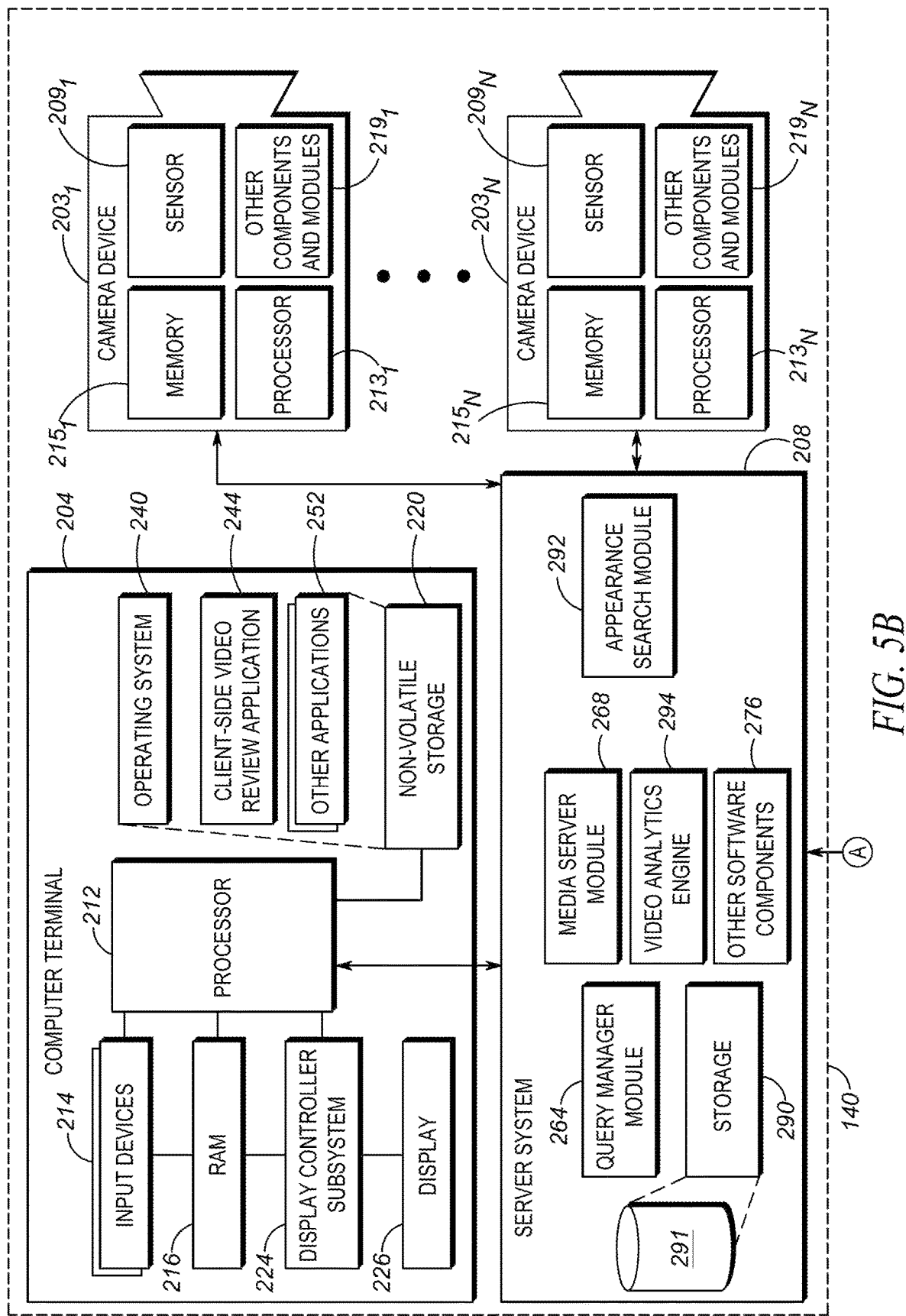

FIG. 5A-5B illustrate a security ecosystem capable of configuring and automating workflows. In particular, FIGS. 5A-5B show security ecosystem 100 with an expanded view of video security system 140. As shown, video security system 140 comprises a plurality of cameras 142 and gateway 141.

Included within the illustrated video security system 140 are one or more computer terminals 204 and a server system 208. In some example embodiments, the computer terminal 204 is a personal computer system; however in other example embodiments the computer terminal 204 is a selected one or more of the following: a handheld device such as, for example, a tablet, a phablet, a smart phone or a personal digital assistant (PDA); a laptop computer; a smart television; and other suitable devices. With respect to the server system 208, this could comprise a single physical machine or multiple physical machines. It will be understood that the server system 208 need not be contained within a single chassis, nor necessarily will there be a single location for the server system 208. As will be appreciated by those skilled in the art, at least some of the functionality of the server system 208 can be implemented within some other part of the security ecosystem 100 (for example, the computer terminal 204, the workstation 101, etcetera) rather than within the server system 208.

The computer terminal 204 communicates with the server system 208 through one or more networks. These networks can include the Internet, or one or more other public/private networks coupled together by network switches or other communication elements. The network(s) could be of the form of, for example, client-server networks, peer-to-peer networks, etc. Data connections between the computer terminal 204 and the server system 208 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 204 and the server system 208 are within the same Local Area Network (LAN).

As will be appreciated by those skilled in the art, at least some of the functionality of the computer terminal 204 can be implemented within some other part of the security ecosystem 100 (for example, the workstation 101, the access control system 160, etcetera) rather than within the server system 208.

The computer terminal 204 includes at least one processor 212 that controls the overall operation of the computer terminal. The processor 212 interacts with various subsystems such as, for example, input devices 214 (such as a selected one or more of a keyboard, mouse, touch pad, roller ball and voice control means, for example), random access memory (RAM) 216, non-volatile storage 220, display controller subsystem 224 and other subsystems. The display controller subsystem 224 interacts with display screen 226 and it renders graphics and/or text upon the display screen 226. In some examples, the computer terminal 204 may include more than one display screen 226 (it is contemplated that the computer terminal 204 may include any suitable number of display screens).

Still with reference to the computer terminal 204 of the video security system 140, operating system 240 and various software applications used by the processor 212 are stored in the non-volatile storage 220. The non-volatile storage 220 is, for example, one or more hard disks, solid state drives, or some other suitable form of computer readable medium that retains recorded information after the computer terminal 204 is turned off. Regarding the operating system 240, this includes software that manages computer hardware and software resources of the computer terminal 204 and provides common services for computer programs. Also, those skilled in the art will appreciate that the operating system 240, client-side video review application 244, and other applications 252, or parts thereof, may be temporarily loaded into a volatile store such as the RAM 216. The processor 212, in addition to its operating system functions, can enable execution of the various software applications on the computer terminal 204.

Regarding the video review application 244, this can be run on the computer terminal 204 and may include a search User Interface (UI) module for cooperation with a search session manager module in order to enable a computer terminal user to carry out actions related to providing input in relation images, live video and video recordings (such as, for example, input to facilitate carrying out one or more appearance searches). Also, regarding the aforementioned search session manager module, this provides a communications interface between the search UI module and a query manager module 264 of the server system 208. In at least some examples, the search session manager module communicates with the query manager module 264 through the use of Remote Procedure Calls (RPCs). The query manager module 264 receives and processes queries originating from the computer terminal 204, which may facilitate retrieval and delivery of specifically defined video data (and respective metadata) in support of, for example, client-side video review, video export, managing event detection, etc. In this regard, the query manager module 264 is communicatively coupled to one or more data stores 290 (described later herein in more detail) and an appearance search module 292 that supports appearance searches.

Still with reference to FIG. 1, the server system 208 includes several software components (besides the query manager module 264 already described) for carrying out other functions of the server system 208. For example, the server system 208 includes a media server module 268. The media server module 268 handles client requests related to storage and retrieval of security video taken by camera devices $203_1$-$203_n$ in the video security system 140. The server system 208 also includes a video analytics engine 294. The video analytics engine 294 can, in some examples, be any suitable one of known commercially available software that carry out computer vision related functions (complementary to any video analytics performed in the security cameras) as understood by a person of skill in the art. Also, those skilled in the art will appreciate that, in some instances, the video analytics engine may be programmed with a detection classifier that evaluates a received video stream (for example, an image or part of an image of the video stream captured by one of camera devices $203_1$-$203_n$ which are described in more detail later herein) to determine if an instance of an object of interest that is defined in the detection classifier is detected or not from the evaluated video stream.

The server system 208 also includes a number of other software components 276. These other software components will vary depending on the requirements of the server system 208 within the overall system. As one example, the other software components 276 might include special test and debugging software, or software to facilitate version updating of modules within the server system 208.

Regarding the data store 290, this comprises, for example, one or more databases 291 which may facilitate the organized storing of recorded security video, non-video sensor data, still images, etc. in accordance with example embodiments. The one or more databases 291 may also contain metadata related to, for example, the recorded security video that is storable within the one or more data stores 290. Examples of metadata that may be expected to be derived directly or indirectly from video data include location in field of view, object ID, bounding box-related data, tracking position relative to field of view, etc.

Optionally, the video security system 140 may include connections to one or more cloud services. For example, the computer terminal 204 may be connected to the cloud service(s) by the Internet and/or one or more wireless and/or wired wide area networks (examples of which were previously herein detailed). Similarly, the server system 208 may be connected to the cloud service(s) by the Internet and/or one or more wireless and/or wired wide area networks (examples of which were previously herein detailed). As will be appreciated by those skilled in the art, part of the functionalities herein described as being provided by the server system 208 may optionally be instead fully or partly provided by the cloud service(s). In some examples, one or more storages are provided at the cloud service location to store video and/or still images employed within the video security system 140.

The illustrated video security system 140 includes the plurality of camera devices $203_1$-$203_n$ (hereinafter interchangeably referred to as "cameras $203_1$-$203_n$" when referring to all of the illustrated cameras, or "camera 203" when referring to any individual one of the plurality) being operable to capture a plurality of images and produce image data representing the plurality of captured images. The camera 203 is an image capturing device and includes security video cameras. Furthermore, it will be understood that the video security system 140 includes any suitable number of cameras (i.e. n is any suitable integer greater than one).

The camera 203 includes an image sensor 209 (corresponding to one of the sensors 2091-209N shown in FIG. 1) for capturing a plurality of images. The camera 203 may be a digital video camera and the image sensor 209 may output captured light as a digital data. For example, the image sensor 209 may be a CMOS, NMOS, or CCD. In some embodiments, the camera 203 may be an analog camera connected to an encoder. The illustrated camera 203 may be a 2D camera; however use of a structured light 3D camera, a time-of-flight 3D camera, a 3D Light Detection and Ranging (LiDAR) device, a stereo camera, or any other suitable type of camera within the video security system 140 is contemplated.

The image sensor 209 may be operable to capture light in one or more frequency ranges. For example, the image sensor 209 may be operable to capture light in a range that substantially corresponds to the visible light frequency range. In other examples, the image sensor 209 may be operable to capture light outside the visible light range, such as in the infrared (IR) and/or ultraviolet range. In other examples, the camera 203 may be a "multi-sensor" type of camera, such that the camera 203 includes pairs of two or more sensors that are operable to capture light in different and/or same frequency ranges.

The camera 203 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Pan-Tilt-Zoom (PTZ) camera, dome camera, in-ceiling camera, box camera, and bullet camera.

Additionally, or alternatively, the camera 203 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

The camera 203 includes one or more processors 213 (corresponding to one of the processors $213_1$-$213_N$ shown in FIG. 1), other components and modules 219 (corresponding to one of drawing elements $219_1$-$219_N$ shown in FIG. 1), and one or more memory devices 215 (corresponding to one of the memories $215_1$-$215_N$ shown in FIG. 1) coupled to the processors and one or more network interfaces. Regarding the other components and modules 219, just one example amongst various others would be a video analytics module. A video analytics module within the camera 203 may generate metadata outputted to the server system 208. The metadata can include, for example, records which describe various detections of objects such as, for instance, pixel locations for the detected object in respect of a first record and a last record for the camera within which the respective metadata is being generated.

Regarding the memory device 215, this can include a local memory (such as, for example, a random access memory and a cache memory) employed during execution of program instructions. Regarding the processor 213, this executes computer program instructions (such as, for example, an operating system and/or software programs), which can be stored in the memory device 215.

In various embodiments the processor 213 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 203, including the processor 213, may be combined together on one semiconductor chip. For example, the processor 213, the memory device 215 and the network interface of the camera 203 may be implemented within a SOC. Furthermore, when implemented in this way, a general purpose processor and one or more of a GPU or VPU, and a DSP may be implemented together within the SOC.

In various example embodiments, the memory device 215 coupled to the processor 213 is operable to store data and computer program instructions. The memory device 215 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 215 may be operable to store memory as volatile memory, non-volatile memory, dynamic memory, etc. or any combination thereof.

Continuing on, the camera 203 is coupled to the server system 208. In some examples, the camera 203 is coupled to the server system 208 via one or more suitable networks. These networks can include the Internet, or one or more other public/private networks coupled together by network switches or other communication elements. The network(s) could be of the form of, for example, client-server networks, peer-to-peer networks, etc. Data connections between the camera 203 and the server system 208 can be any number of known arrangements, examples of which were previously herein detailed. In at least one example embodiment, the camera 203 and the server system 208 are within the same Local Area Network (LAN). In some examples, the camera 203 may be coupled to the server system 208 in a more direct manner than as described above.

Although the video security system 140 illustrated in FIG. 5A-5B only explicitly show camera devices coupled to the server system 208, it will be understood that the video security system 140 is not limited in contemplated compositions to just camera devices. Some examples of the video security system 140 include a heterogeneous mixture of both camera devices and other sensor devices coupled to the server system 208. One type of alternative sensor device is a radar-based sensor device such as, for example, the Avigilon Presence Detector (APD)™ sold by Avigilon Corporation.

Cameras 142 may be fixed or mobile, and may have pan/tilt/zoom (PTZ) capabilities to change their field of view. Cameras 142 may also comprise circuitry configured to serve as a video analysis engine (VAE) which comprises a software engine that analyzes analog and/or digital video. The engine configured to "watch" video and detect preselected objects such as license plates, people, faces, automobiles. The software engine may also be configured to detect certain actions of individuals, such as fighting, loitering, crimes being committed, . . . , etc. The VAE may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires.

Regarding the gateway 141, this is configured to run, for example, any Application Program Interfaces (APIs) providing communications between the video security system 140 and the workflow server 102.

Figure 6:
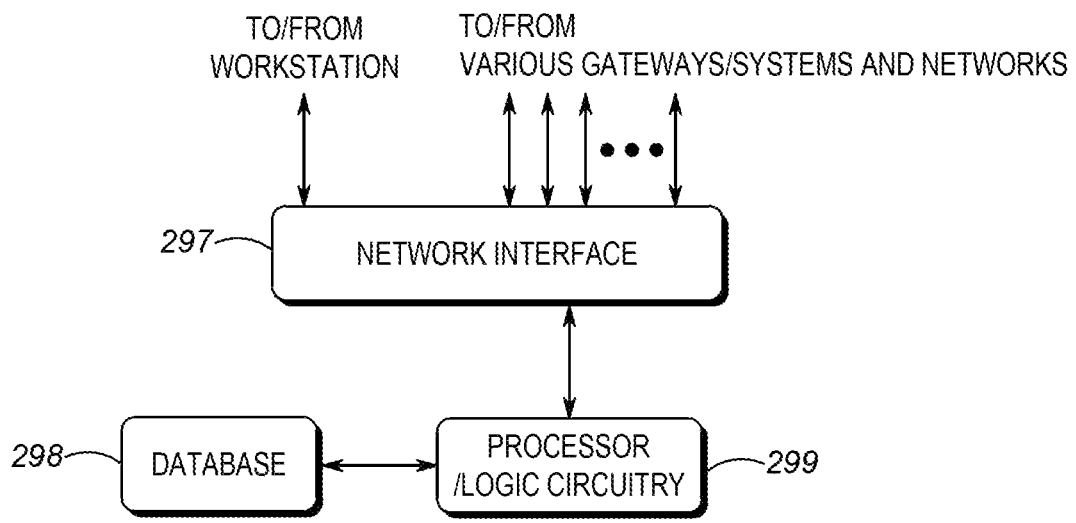
FIG. 6 is a block diagram of a workflow server of FIG. 1.

FIG. 6 is a block diagram of the workflow server 102 of FIG. 1. As shown, workflow server 102 comprises network interface 297, storage 298, and processor (serving as logic circuitry) 299.

Network interface 297 includes elements including processing, modulating, and transceiver elements that are operable in accordance with any one or more standard or proprietary wireless interfaces, wherein some of the functionality of the processing, modulating, and transceiver elements may be performed by means of processor 299 through programmed logic such as software applications or firmware stored on the storage 298 or through hardware. Examples of network interfaces (wired or wireless) include Ethernet, T1, USB interfaces, IEEE 802.11b, IEEE 802.11g, etc.

Logic circuitry 299 comprises a digital signal processor (DSP), general purpose microprocessor, a programmable logic device, or application specific integrated circuit (ASIC) and is configured to receive triggers from various gateways, systems, and networks. Once a trigger is received, logic circuitry 299 is configured to execute (or cause to be executed) a particular action for the trigger. More particularly, when logic circuitry 299 receives a trigger from any attached network or system, logic circuitry will access database a database of the storage 298 to determine an action for the particular trigger. Once an action has been determined, logic circuitry will execute the action, or cause the action to be executed. In order to perform the above, logic circuitry executes an instruction set/software (e.g., Motorola Solution's Command Central™ software suite comprising the Orchestrate™ platform) stored in database of the storage 298.

The database of the storage 298 serves to store associations between triggers and actions. This is illustrated in Table 1, below.

TABLE 1

| Associations Between Triggers and Actions | |
|---|---|
| Trigger | Action |
| Warehouse back door opened | Pan camera 342 to point at door |
| Man-Down sensor activated for Officer Smith | Notify dispatch center via emergency text message |
| ALPR for delivery truck | Open back gate |
| . . . etc. | . . . etc. |

Figure 7:
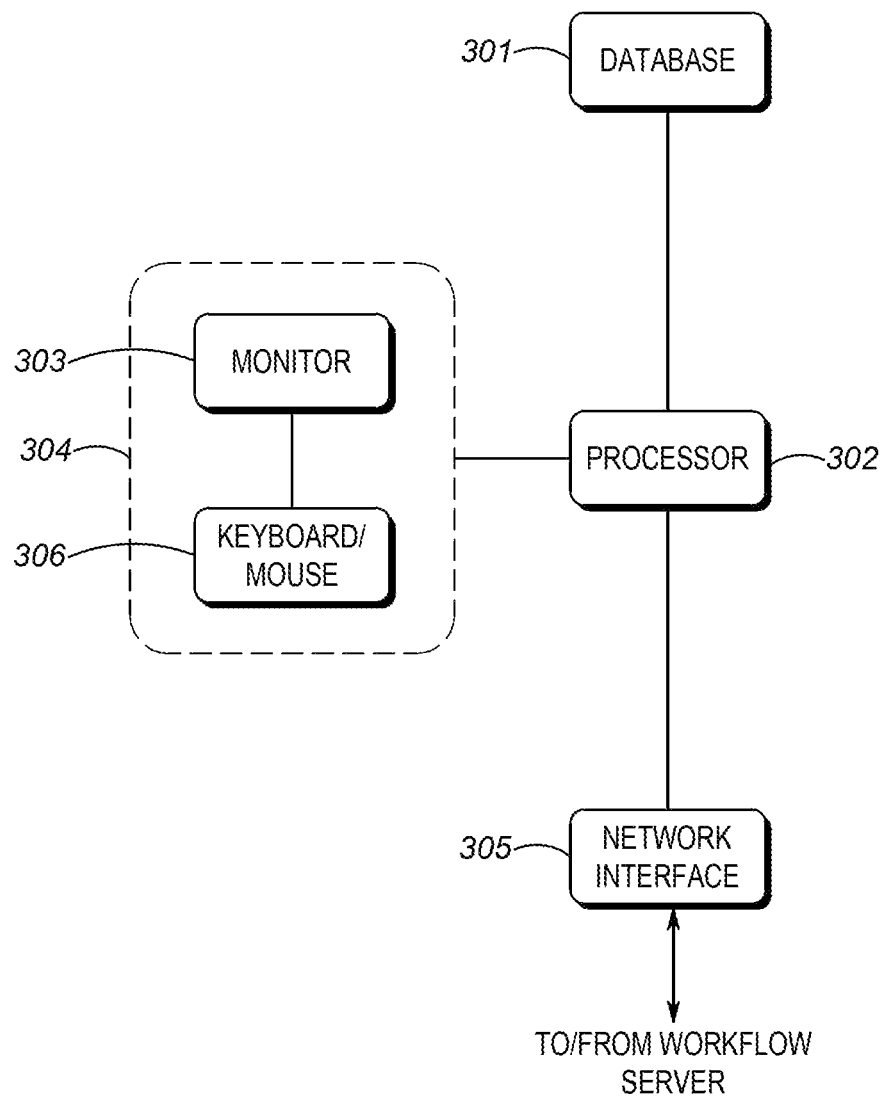
FIG. 7 is a block diagram of a workstation of FIG. 1 utilized to create a workflow.

FIG. 7 is a block diagram of a workstation of FIG. 1 utilized to create a workflow. As shown, workstation 101 comprises database 301, processor 302, graphical user interface 304, and network interface 305.

Network interface 305 includes elements including processing, modulating, and transceiver elements that are operable in accordance with any one or more standard or proprietary wireless interfaces, wherein some of the functionality of the processing, modulating, and transceiver elements may be performed by means of processor 302 through programmed logic such as software applications or firmware stored on the storage component 301 (e.g., standard random access memory) or through hardware.

Examples of network interfaces (wired or wireless) include Ethernet, T1, USB interfaces, IEEE 802.11b, IEEE 802.11g, etc.

Logic circuitry 302 comprises a digital signal processor (DSP), general purpose microprocessor, a programmable logic device, or application specific integrated circuit (ASIC) and is configured to execute Motorola Solution's Orchestrate™ and Ally™ dispatch and incident management software from storage 301. The execution of such software will allow users of GUI 304 to create workflows (i.e., actions and their associated responses) by receiving user inputs from GUI 304 that define various triggers and their associated actions, which will ultimately be uploaded to workflow server 102 and stored in a database of the storage 298.

Database 301 comprises standard memory (such as RAM, ROM, . . . , etc) and serves to store instructions as software. Particularly, Motorola Solution's Orchestrate™ and Ally™ dispatch and incident management software is stored in database 301.

GUI 304 provides a man/machine interface for receiving an input from a user and displaying information. For example, GUI 304 provides a way of conveying (e.g., displaying) user-created workflows. Thus, GUI 304 also provides means for a user to input workflows into a displayed form. In order to provide the above features (and additional features), GUI 304 may comprises any combination of monitor 303 (e.g., touch screen, a computer screen, . . . , etc.) and keyboard/mouse combination 306.

Figure 8:
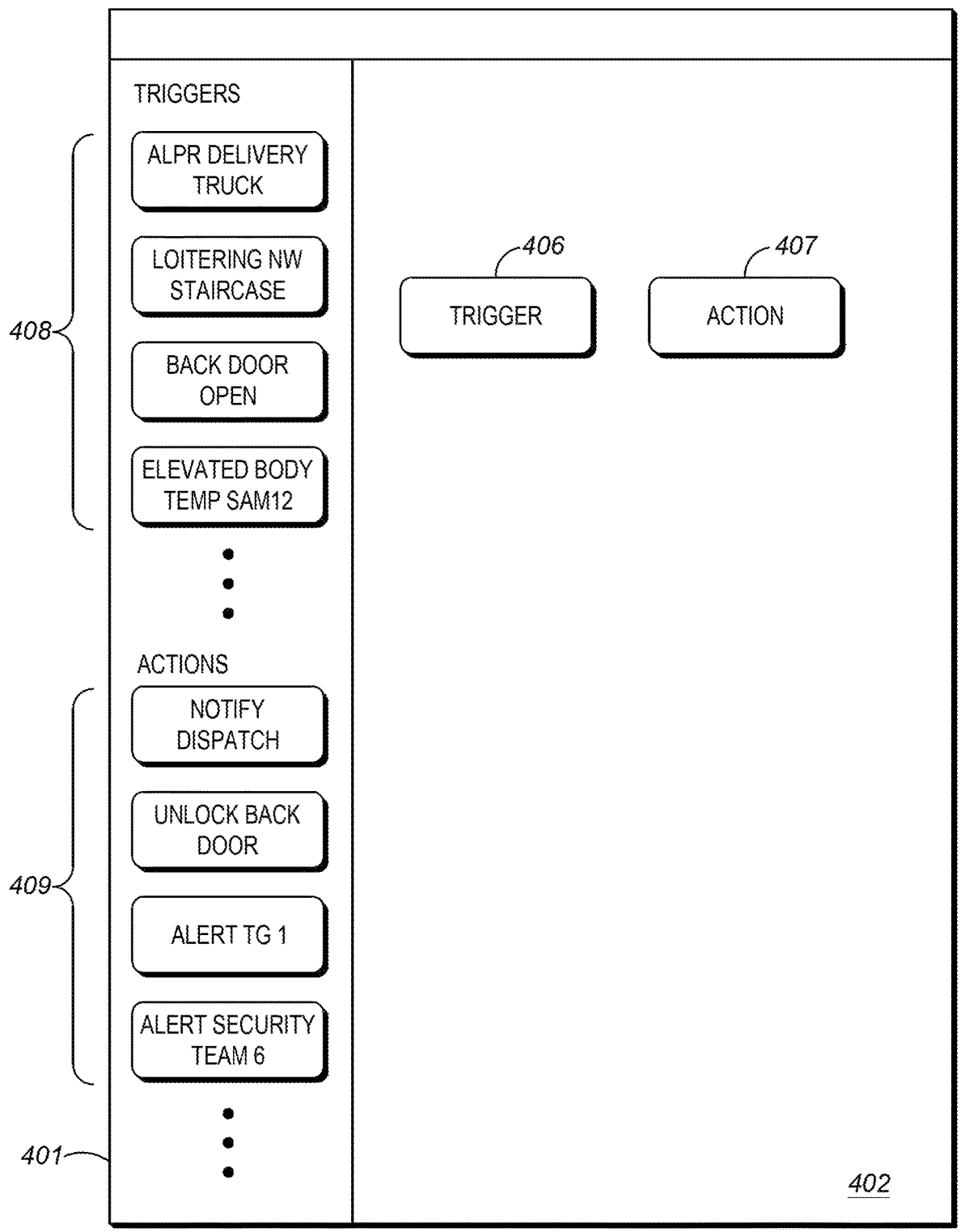
FIG. 8 illustrates the creation of a workflow.

FIG. 8 illustrates the creation of a workflow. More particularly, FIG. 8 illustrates a dashboard displayed on monitor 303 utilized for the creation of workflows. The dashboard consists of the following main elements:

- selection pane 401 on the left-hand side, which comprises the available triggers 408 and actions 409;
- workspace 402, which comprises the large area in the middle of the dashboard used to create workflows that define the connections between products. Each workflow in the workspace is displayed as a separate field 406 and 407 with an outline and a title. As shown in FIG. 8, two fields 406 and 407 are shown, one labeled "trigger" and another labeled "action".

Triggers 408 represent the events originating from various sensors, software, and devices within security ecosystem 100. Actions 409 represent the possible responses to the triggers.

After a workflow is deployed (i.e., uploaded to workflow server 102), its actions activate when the triggers occur. Triggers and actions appear on the workspace after they are dragged and dropped from the triggers 408 and actions 409 tabs respectively. Connecting the triggers and actions on the workspace (as described below) will create a workflow.

All triggers 408 and actions 409 are stored in database 301 and represent integrations across multiple products. In other words, triggers and actions comprise triggers and actions for all of the components available in security ecosystem 100. This includes cameras, sensors, IoT devices, radios, . . . , etc. In the case where additional technology pieces are added to the security ecosystem 100, those pieces are automatically made available for workflow creation as discussed herein.

In order to associate a trigger with an action, a user selects a trigger from all possible triggers 406, and drags and drops it onto workspace area 402. The user then selects an action for the trigger, and drags and drops it onto workspace area 402. In order to associate the trigger with the action, they must be connected. To connect the trigger and actions, a user will click the end of one of the node, and drag a line to the other node.

Figure 9:
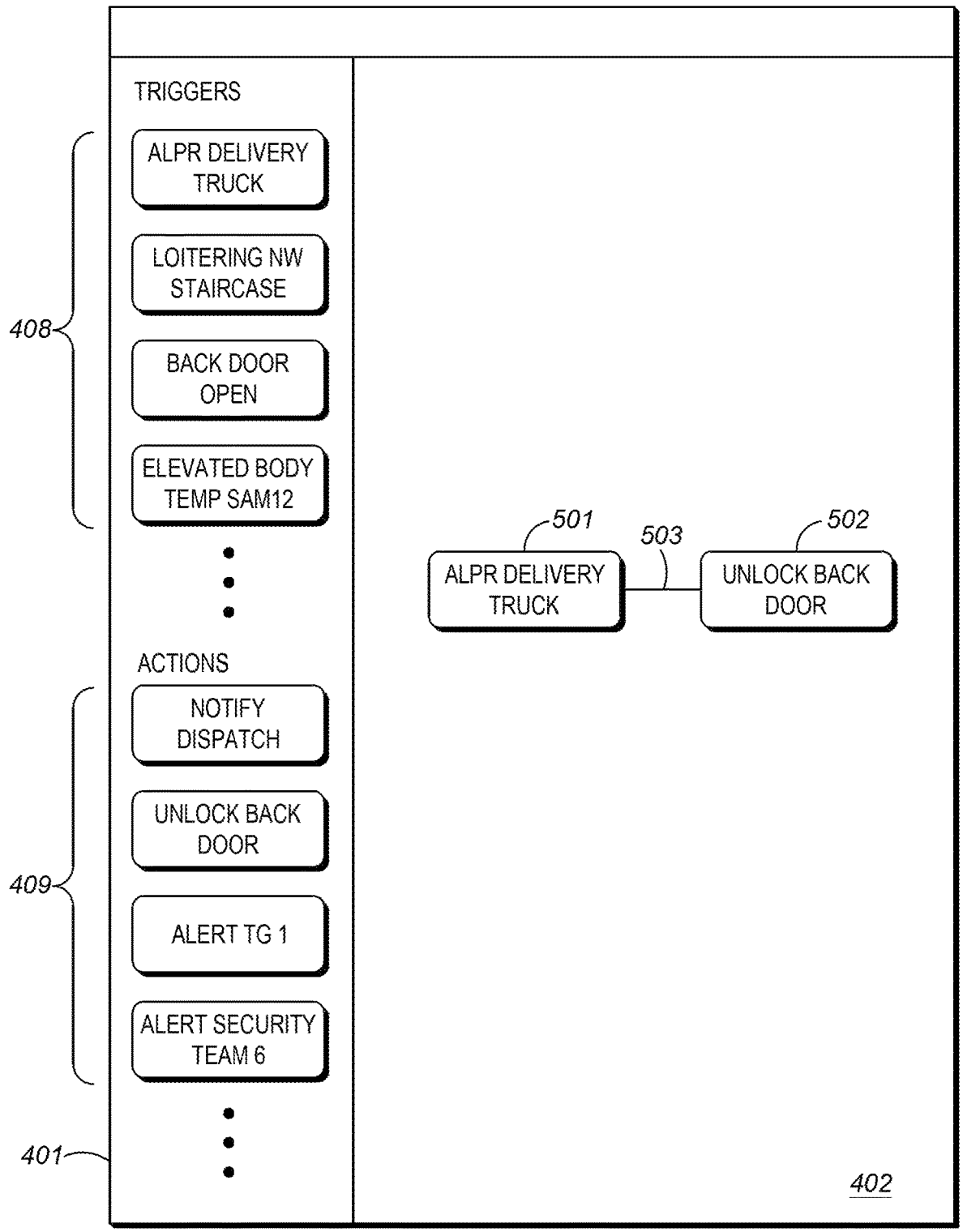
FIG. 9 illustrates the creation of a workflow.

As shown in FIG. 9, a trigger "ALPR delivery truck" 501 has been associated with an action "unlock back door" 502 by dragging line 503 between the two. If any of the triggers within a trigger group occurs, the workflow is initiated causing the action to be executed.

Figure 10:
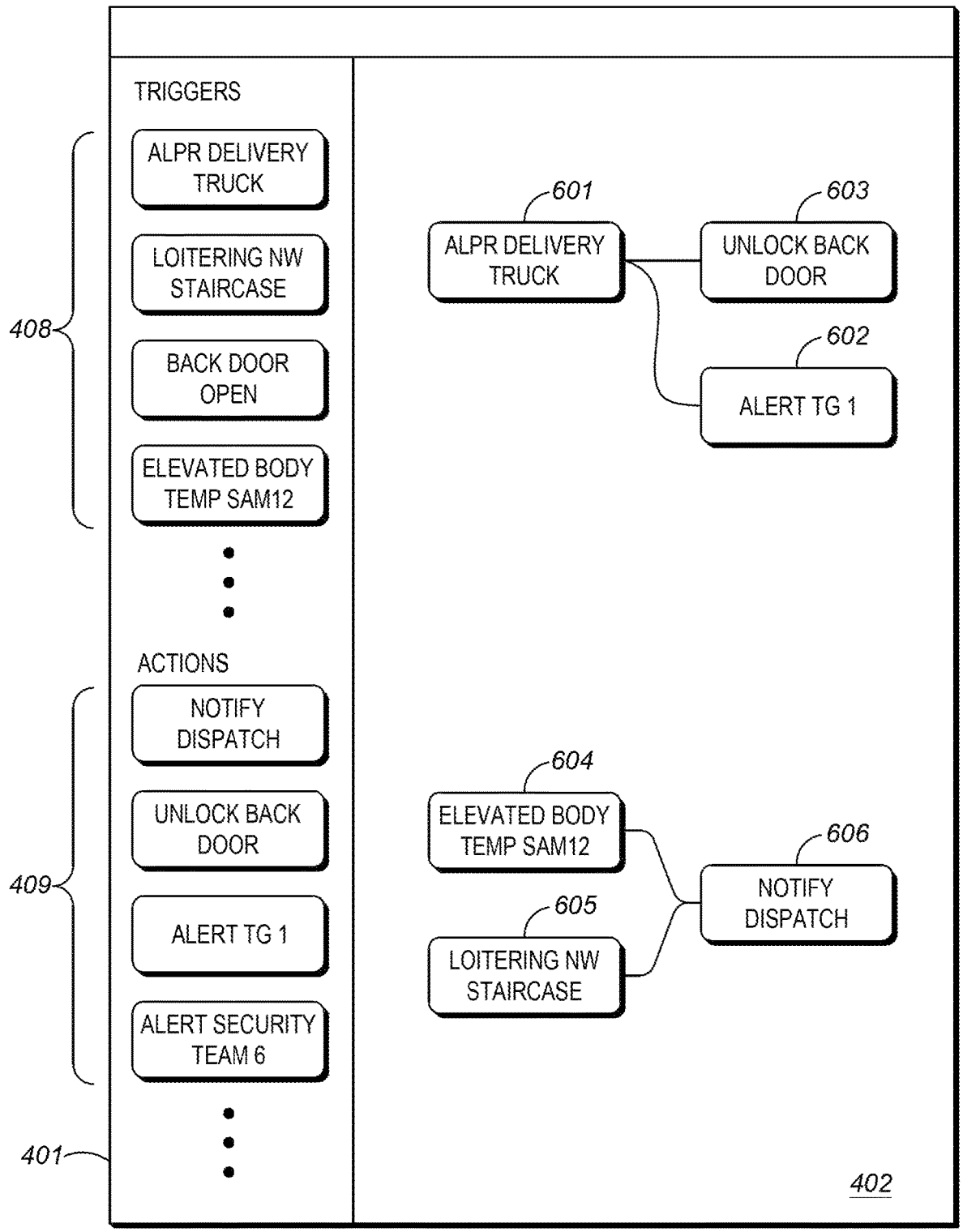
FIG. 10 illustrates the creation of a workflow.

As illustrated in FIG. 10, a single trigger may be associated with multiple actions. Thus, the trigger "ALPR delivery truck" 601 may be associated with action "unlock back door" 603 as well as associated with "alert TG 1" 602. When this workspace is uploaded to workflow server 102, the automatic license plate detected for the delivery truck will cause both the back door to unlock and an alert to be sent on talkgroup #1.

In a similar manner multiple triggers may be associated with a single action. Thus, both the triggers "elevated body tem SAM 12" 604 and "loitering NW staircase" will cause the action of "notify dispatch" 606. Thus, when officer SAM 12 has an elevated body temperature dispatch is notified, and when loitering is detected in the NW staircase, dispatch is notified.

Figure 11:
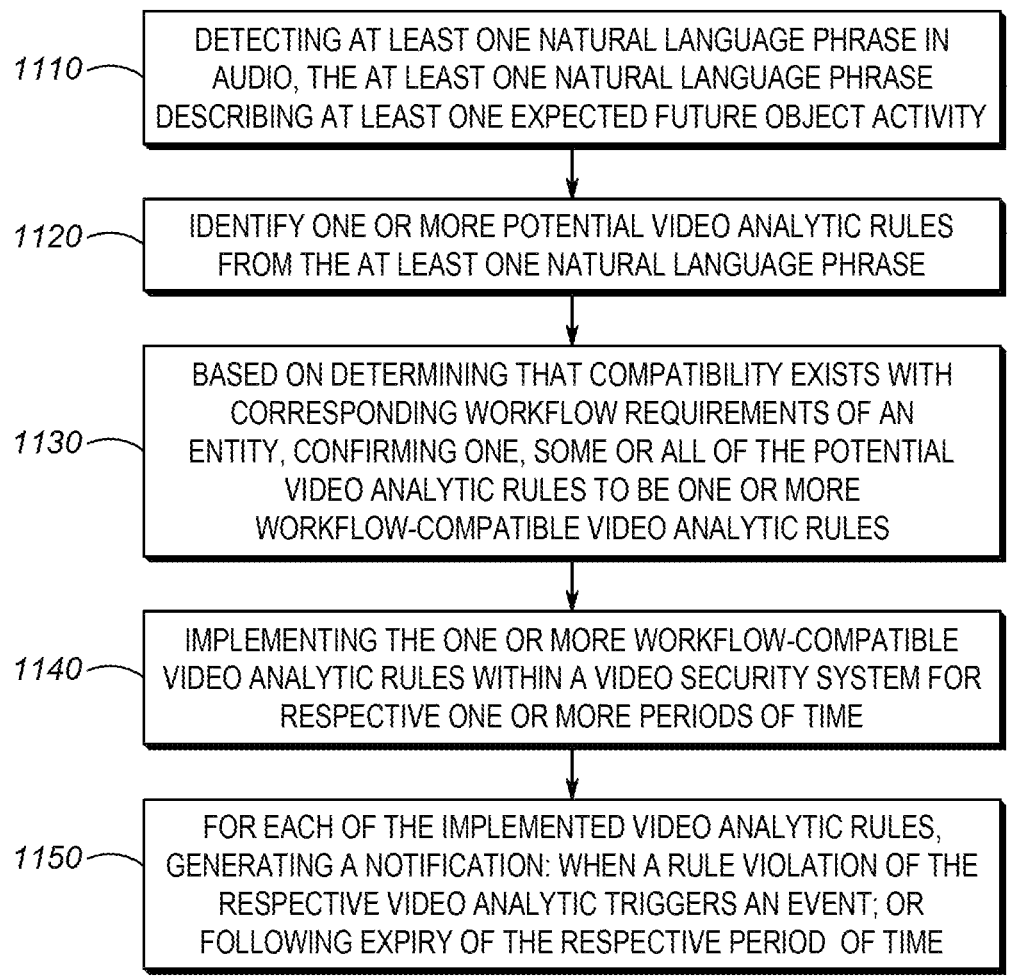
FIG. 11 is a flow chart illustrating a method in accordance with an example embodiment.
Figure 12:
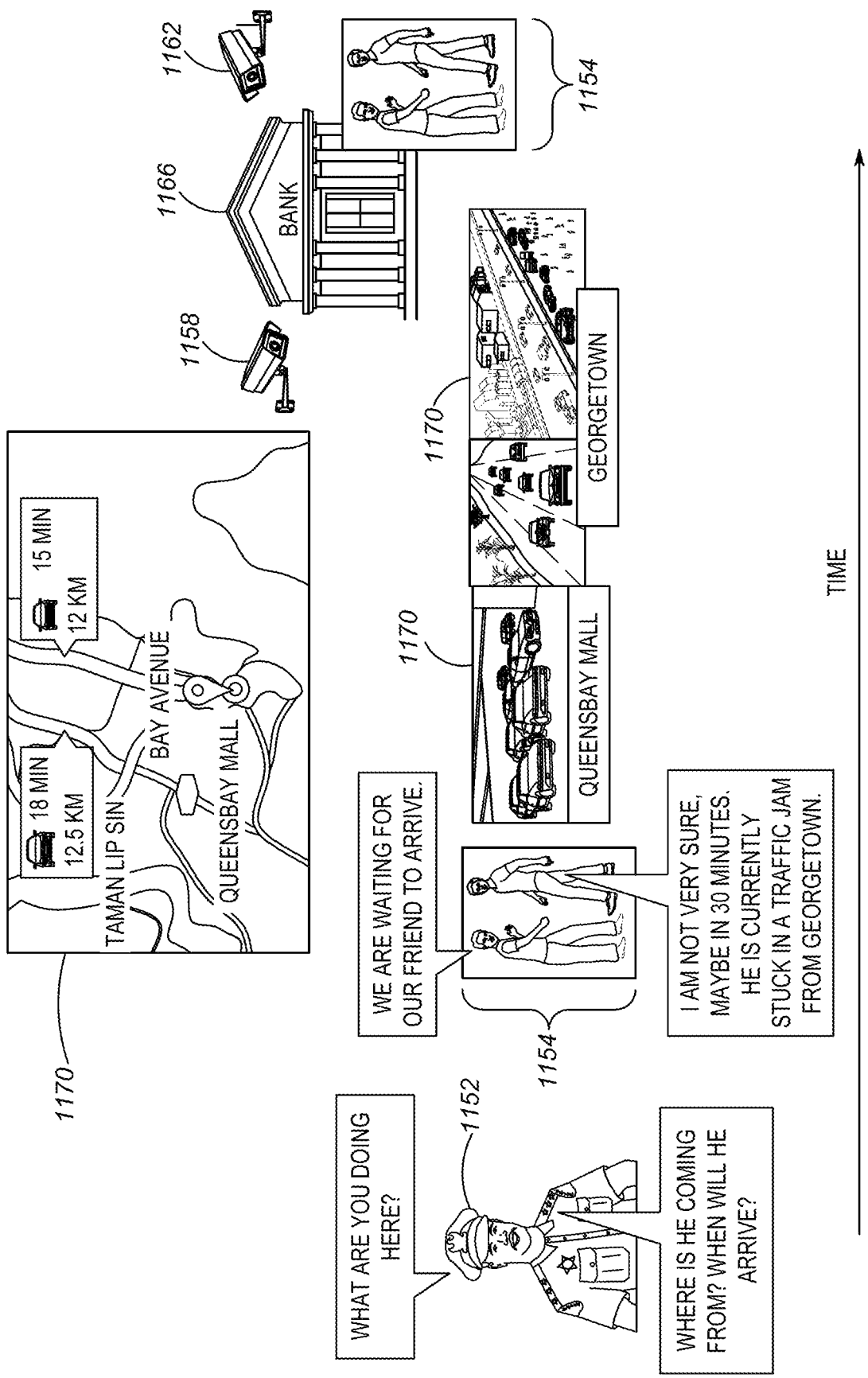
FIG. 12 is a diagram illustrating an example use case corresponding to the example embodiment of FIG. 11.

Reference is now made to FIGS. 11 and 12. FIG. 11 is a flow chart illustrating a method 1100 in accordance with an example embodiment, and FIG. 12 is a diagram illustrating an example use case (hereinafter referred to as the "suspicious activity use case") corresponding to the example embodiment of FIG. 11.

First, the illustrated method 1100 includes detecting (1110) at least one natural language phrase in audio, and the at least one natural language phrase describing at least one expected future object activity. This at least one expected future object activity is in a definable physical or geographic region.

For example, for the suspicious activity use case a security guard 1152 is asking some questions to two individuals 1154. The conversation may be picked up by, for example, a microphone that is included in the public-safety radio 137 (FIG. 4) or the radio 153 (FIG. 3) or the smart accessory 112 (FIG. 4) (such as, for example, a body-worn camera) which may be carried by the security guard 1152. Relevant natural language phrases in the conversation include capturing parameters/expected future object activity (such as, for example, duration or destination or action) given by the two individuals 1154 such as, for instance, "we are waiting", "friend to arrive", "30 minutes" and "stuck in a traffic jam from Georgetown".

As another example (hereinafter referred to as the "safe school use case"), a parent of a student at a school campus may approach a gate of the campus and speak into a security intercom which may be partly or fully operated by artificial intelligence running on at least one processor of the security ecosystem 100 or the parent may be speaking to a security guard, where the conversation may be picked up by, for example, a microphone that is included in the public-safety radio 137 (FIG. 4) or the radio 153 (FIG. 3) or the smart accessory 112 (FIG. 4) (such as, for example, a body-worn camera) which may be carried by the security guard. Based on partial or full Interactive Voice Response (IVR) the security ecosystem 100 may gather identification information and expected future object activity of the parent such as the parent's name is Jack, the student's name is John, details of any waypoint(s).

Next, the illustrated method 1100 includes identifying (1120) one or more potential video analytic rules from the at least one natural language phrase. In terms of the suspicious activity use case, this may be carried out by employing, as input, some or all of the previously mentioned relevant natural language phrases within one or more of the computer terminal 204 (FIG. 5B) and the server system 208 (FIG. 5B) to carry out initial filtering of potential video analytic rules. In terms of the safe school use case, the carrying out of the initial filtering of potential video analytic rules may be similarly implemented.

Next, the illustrated method 1100 includes confirming (1130) one, some or all of the potential video analytic rules to be one or more workflow-compatible video analytic rules. The confirming is based on determining that compatibility exists with corresponding workflow requirements of an entity. In terms of the suspicious activity use case, at least one processor of the security ecosystem 100 may determine that workflow-compatible video analytic rules (in particular, temporary/dynamic video analytic rules) can be set up on video cameras 1158 and 1162 (each of which may be similar to the camera 203 shown in FIG. 5B) near or attached to bank 1166, and for a specific period of time, to provide security support for the ongoing suspicious activity situation. Similarly for the safe school use case, there may be camera(s) at or near the parent's final destination and/or waypoint(s) configured to have workflow-compatible video analytic rules, that are also temporary/dynamic, set up on them for a specific period of time.

Next, the illustrated method 1100 includes implementing (1140) the one or more workflow-compatible video analytic rules within a video security system for respective one or more periods of time. For instance, in at least one non-limiting example the video analytics engine 294 of the video security system 140 (FIG. 5B) implements the one or more workflow-compatible video analytic rules. Also, it is contemplated that parameters for the one or more workflow-compatible video analytic rules may be derived in part from secondary sources. For example, in the suspicious activity use case secondary sources 1170 include estimated time of arrival data from a Global Positioning System (GPS)-based mapping software and ALPR data from locations (Queensbay Mall and Georgetown) within some defined geographic perimeter. In the safe school use case, parameters for the one or more workflow-compatible video analytic rules may also be derived in part from secondary sources such as, for example, a look up table of travel times (walking, driving, etcetera) between different locations within a school campus, or from a door access control, or a WIFI login using personal smartphone, etc.

Finally, the illustrated method 1100 includes, for each of the implemented video analytic rules, generating (1150) a notification: when a rule violation of the respective video analytic triggers an event; or following expiry of the respective period of time. For example, for the suspicious activity use case it may be that video analytics run on video from one or more of the cameras 1158 and 1162 may identify red flag behavior carried out by the individuals 1154 (such as, for instance, holding and pointing a camera at the bank 1166 indicative of images of the bank 1166 being collected by the individuals 1154). In respect of the safe schools use case, after a period of time has expired and no image has been captured of the parent by a camera located at the classroom of the student, then a notification (for instance, a text message or computer voice message) may be sent to, for instance, radio(s) being carried by security guard(s).

Figure 13:
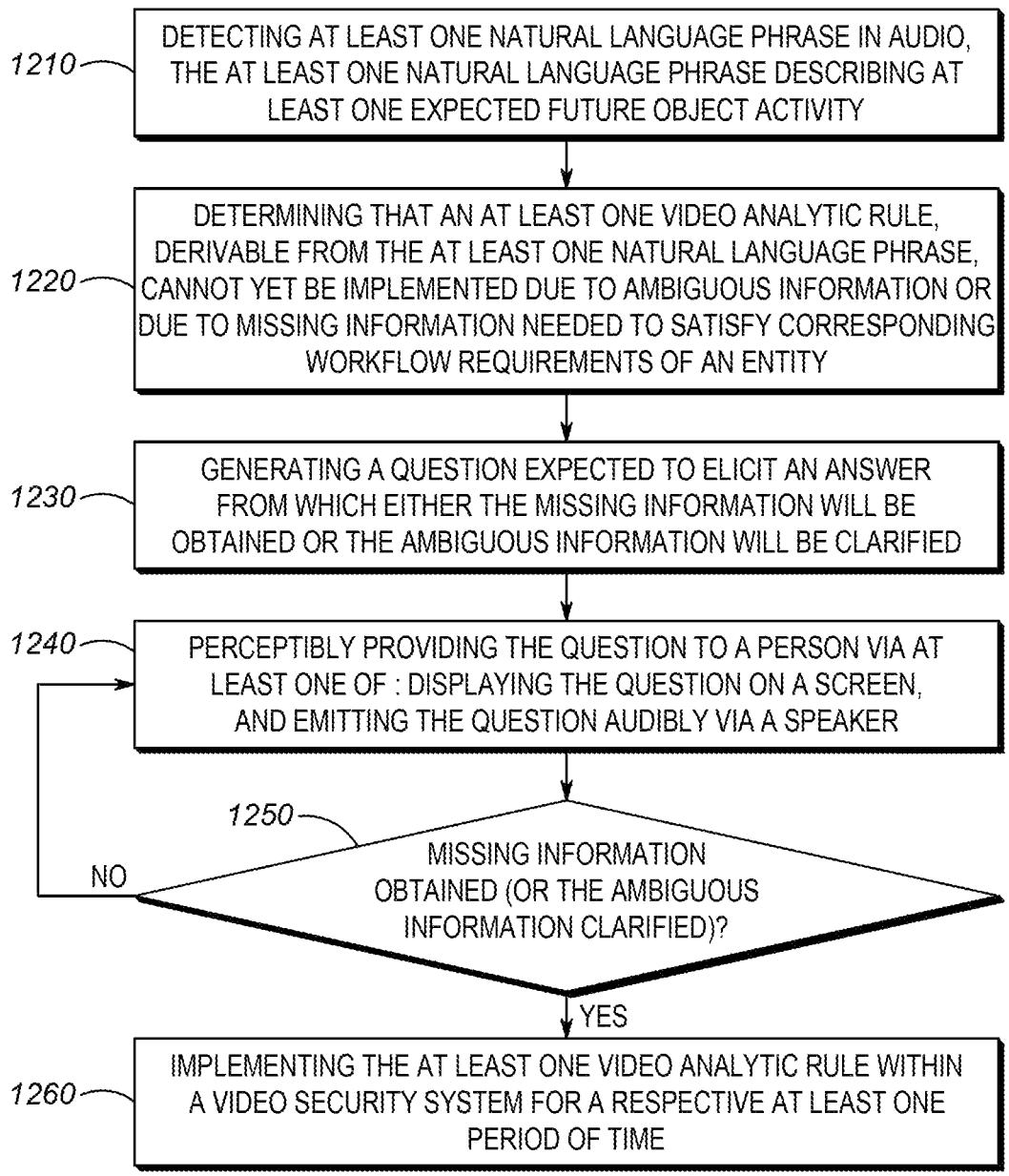
FIG. 13 is another flow chart illustrating another method in accordance with an example embodiment.

Reference is now made to FIG. 13. FIG. 13 is a flow chart illustrating a method 1200 in accordance with an example embodiment.

First, the illustrated method 1200 includes detecting (1210) at least one natural language phrase in audio, the at least one natural language phrase describing at least one expected future object activity.

Next, the illustrated method 1200 includes determining (1220) that an at least one video analytic rule, derivable from the at least one natural language phrase, cannot yet be implemented due to ambiguous information or due to missing information needed to satisfy corresponding workflow requirements of an entity.

Next, the illustrated method 1200 includes generating (1230) a question expected to elicit an answer from which either the missing information will be obtained or the ambiguous information will be clarified.

Next, the illustrated method 1200 includes perceptibly providing (1240) the question to a person via at least one of displaying the question on a screen, and emitting the question audibly via a speaker.

Following action 1240 is decision action 1250, which is checking whether or not the missing information has been obtained (or the ambiguous information has been clarified). If "NO", the action 1240 follows (for example, artificial intelligence running on at least one processor of security ecosystem 100 keeps trying to obtain the missing information or clarify the ambiguous information). If "YES", then next the at least one video analytic rule is implemented (1260) within a video security system for a respective at least one period of time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
    detecting at least one natural language phrase in audio, wherein the at least one natural language phrase describes at least one expected future object activity in a definable physical or geographic region;
    for each of one or more potential video analytic rules that are derivable from the at least one natural language phrase, determining whether compatibility with corresponding workflow requirements of an entity exists such that one, some or all of the one or more potential video analytic rules are confirmed as one or more workflow-compatible video analytic rules;
    implementing the one or more workflow-compatible video analytic rules within a video security system for respective one or more periods of time; and
    for each of the implemented video analytic rules, generating a notification:
        when a rule violation of the respective video analytic rule triggers an event; or
        following expiry of the respective period of time of the one or more periods of time.

2. The computer-implemented method as claimed in claim 1 wherein the notification provides evidence that is either confirming or contradicting in relation to whether the future object activity actually transpired.

3. The computer-implemented method as claimed in claim 1 wherein the one or more workflow-compatible video analytic rules are applied to live video accessible at one or more video cameras forming a part of the video security system.

4. The computer-implemented method as claimed in claim 1 wherein the event is at least one of an unusual activity event and a detection of unusual motion of an object present at one or more of a sensitive location and a sensitive time.

5. The computer-implemented method as claimed in claim 1 wherein:
    the notification provides evidence that is contradicting in relation to whether the future object activity actually transpired, and
    the future object activity is a departure of an object from the definable physical or geographic region.

6. The computer-implemented method as claimed in claim 1 wherein:
    the notification provides evidence that is contradicting in relation to whether the future object activity actually transpired, and
    the future object activity is an arrival of an object into the definable physical or geographic region.

7. The computer-implemented method as claimed in claim 1 wherein the audio is received via a microphone located remote from the definable physical or geographic region.

8. The computer-implemented method as claimed in claim 1 wherein the implementing of the one or more workflow-compatible video analytic rules within the video security system includes adding at least one entry to a watch list for either facial recognition alerting or license plate recognition alerting.

9. The computer-implemented method as claimed in claim 1 wherein the rule violation occurs based on a confidence score being exceeded.

10. The computer-implemented method as claimed in claim 9 further comprising:

checking secondary sources to determine an apparent inaccuracy of a statement made in the audio; and increasing the confidence score based on the apparent inaccuracy of the statement.

11. A computer-implemented method comprising:

detecting at least one natural language phrase in audio, wherein the at least one natural language phrase describes at least one expected future object activity in a definable physical or geographic region;

determining that an at least one video analytic rule, derivable from the at least one natural language phrase, cannot yet be implemented due to ambiguous information or due to missing information needed to satisfy corresponding workflow requirements of an entity;

generating a question expected to elicit an answer from which either the missing information will be obtained or the ambiguous information will be clarified;

perceptibly providing the question to a person via at least one of displaying the question on a screen, and emitting the question audibly via a speaker; and once the missing information is obtained or the ambiguous information is clarified, implementing the at least one video analytic rule within a video security system for a respective at least one period of time.

12. The computer-implemented method of claim 11 further comprising:

detecting an additional natural language phrase in additional audio;

determining that the additional natural language phrase is the answer; and deriving the missing information from the answer.

13. The computer-implemented method as claimed in claim 11 wherein the implementing of the at least one video analytic rule includes applying the at least one video analytic rule to live video accessible at one or more video cameras forming a part of the video security system.

14. The computer-implemented method as claimed in claim 11 wherein the audio is received via a microphone located remote from the definable physical or geographic region.

15. The computer-implemented method as claimed in claim 11 wherein the implementing of the at least one analytic rule within the video security system includes adding at least one entry to a watch list for either facial recognition alerting or license plate recognition alerting.

16. A security ecosystem comprising:

a microphone configured to receive audio;

at least one processor in communication with the microphone, and the at least one processor configured to:

detect at least one natural language phrase in the audio, wherein the at least one natural language phrase describes at least one expected future object activity in a definable physical or geographic region; and for each of one or more potential video analytic rules that are derivable from the at least one natural language phrase, determine whether compatibility with corresponding workflow requirements of an entity exists such that one, some or all of the one or more potential video analytic rules are confirmed as one or more workflow-compatible video analytic rules; and a video security system configured to:

implement the one or more workflow-compatible video analytic rules for respective one or more periods of time; and for each of the implemented video analytic rules, generate a notification:

when a rule violation of the respective video analytic rule triggers an event; or following expiry of the respective period of time of the one or more periods of time.

\* \* \* \* \*